United States Patent
Hull et al.

(10) Patent No.: US 11,953,385 B2
(45) Date of Patent: Apr. 9, 2024

(54) METHOD AND SYSTEM FOR TESTING A FIBER OPTIC MONITORING SYSTEM IN A CONDUIT

(71) Applicant: Hifi Engineering Inc., Calgary (CA)

(72) Inventors: John Hull, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 385 days.

(21) Appl. No.: 17/299,304

(22) PCT Filed: Dec. 2, 2019

(86) PCT No.: PCT/CA2019/051732
§ 371 (c)(1),
(2) Date: Jun. 2, 2021

(87) PCT Pub. No.: WO2020/113323
PCT Pub. Date: Jun. 11, 2020

(65) Prior Publication Data
US 2022/0057275 A1 Feb. 24, 2022

Related U.S. Application Data

(60) Provisional application No. 62/774,612, filed on Dec. 3, 2018.

(51) Int. Cl.
*G01B 11/00* (2006.01)
*G01B 11/16* (2006.01)
(Continued)

(52) U.S. Cl.
CPC ............ *G01K 15/007* (2013.01); *G01B 11/16* (2013.01); *G01D 5/35309* (2013.01); *G01D 18/00* (2013.01); *G01K 11/32* (2013.01)

(58) Field of Classification Search
CPC ...... G01K 15/007; G01K 11/32; G01B 11/16; G01D 5/35309; G01D 18/00
(Continued)

(56) References Cited

U.S. PATENT DOCUMENTS 5,343,286 A * 8/1994 Keeble ................. G01M 11/319
356/73.1
5,821,861 A 10/1998 Hartog et al.
(Continued)

FOREIGN PATENT DOCUMENTS

CA 2805811 A1 8/2013
DE 102008031875 A1 1/2010
(Continued)

*Primary Examiner* — Max H Noori
(74) *Attorney, Agent, or Firm* — D'Ambrosio & Menon, PLLC; Usha Menon

(57) ABSTRACT

An apparatus includes an enclosure having one or more apertures for receiving therethrough optical fiber, and one or more actuators sealed within the enclosure for generating one or more interference signals for interfering with optical fiber within the enclosure such that an optical path length of the optical fiber is altered. A method for verifying an event detection system includes interrogating optical fiber positioned alongside a conduit by sending one or more light pulses along the optical fiber and receiving reflections of the one or more light pulses. The method further includes using an event verification device housed within an enclosure through which passes the optical fiber to generate one or more interference signals for interfering with the optical fiber such that an optical path length of the optical fiber is altered.

22 Claims, 11 Drawing Sheets

(51) Int. Cl.
*G01D 5/353* (2006.01)
*G01D 18/00* (2006.01)
*G01K 11/32* (2021.01)
*G01K 15/00* (2006.01)

(58) Field of Classification Search
USPC .......................................................... 73/1.1
See application file for complete search history.

(56) References Cited

U.S. PATENT DOCUMENTS

| | | | |
|---|---|---|---|
| 6,334,007 B1* | 12/2001 | Clark | G01M 11/088 |
| | | | 356/73.1 |
| 7,701,643 B2* | 4/2010 | Batchko | B33Y 50/02 |
| | | | 359/665 |
| 9,274,290 B2* | 3/2016 | Kachru | G02B 6/4214 |
| 11,471,170 B1* | 10/2022 | Nikou | A61B 34/71 |
| 11,747,901 B1* | 9/2023 | Keller | G06F 3/016 |
| | | | 345/156 |
| 2018/0087372 A1 | 3/2018 | Stokely et al. | |
| 2018/0149528 A1* | 5/2018 | Hull | G01K 1/20 |
| 2018/0266854 A1 | 9/2018 | Moore et al. | |
| 2020/0057220 A1* | 2/2020 | Hull | G02B 6/4438 |
| 2021/0239516 A1* | 8/2021 | Dankers | G01L 1/246 |
| 2022/0342193 A1* | 10/2022 | Humphrey | G02B 19/0052 |

FOREIGN PATENT DOCUMENTS

| | | |
|---|---|---|
| WO | 2013/102252 A1 | 7/2013 |
| WO | 2016/086310 A1 | 6/2016 |
| WO | 2016/183677 A1 | 11/2016 |
| WO | 2017/147679 A1 | 9/2017 |

* cited by examiner

METHOD AND SYSTEM FOR TESTING A FIBER OPTIC MONITORING SYSTEM IN A CONDUIT

FIELD OF THE DISCLOSURE

The present disclosure relates to methods and systems for detecting events, such as leaks, in a conduit, such as a pipeline or a wellbore.

BACKGROUND TO THE DISCLOSURE

Fiber optic cables are often used for distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

Often, a pipeline operates without major incidents (such as leaks), in which case the fiber optic monitoring system should not report any leak-related events. However, one challenge in this situation is ensuring that the monitoring system is indeed functioning properly and is not failing to detect events. In other words, when the monitoring system is not reporting any events, two possibilities exist: either no events are occurring, or events are occurring but the monitoring system is failing to detect them.

There therefore remains a need in the art to efficiently determine whether a fiber optic monitoring system is functioning properly.

SUMMARY OF THE DISCLOSURE

In a first aspect of the disclosure, there is provided an apparatus for use with an event detection system. The apparatus comprises: an enclosure comprising one or more apertures for receiving optical fiber therethrough; and one or more actuators housed within the enclosure and configured to generate one or more interference signals for interfering with optical fiber within the enclosure such that an optical path length of the optical fiber is altered.

Thus, by detecting and reporting events generated by the apparatus, an operator may verify that the event detection system is "live" and active. The apparatus can therefore act as a system "heartbeat". Pipeline companies can use this heartbeat as an indicator of the proper operation of the system, and for example use it in their reporting to regulatory agencies.

The apparatus may further comprise optical fiber passing into and out of the enclosure via the one or more apertures. The optical fiber may be spooled within the enclosure. In some embodiments, the optical fiber may be spooled around a resilient bias, such as a spring.

The one or more actuators may comprise a strain actuator configured to move between first and second positions for displacing optical fiber within the enclosure. The strain actuator may comprise one or more of a piston, an inflatable member, and a gear motor. The apparatus may further comprise a resilient bias, such as a spring, configured to bias optical fiber within the enclosure against displacement from the strain actuator.

The one or more actuators may comprise a thermal device configured to generate or remove heat for adjusting a temperature within the enclosure. The thermal device may comprise one or more of a microchip, a strip heater, heat tape, an incandescent light source, and a thermoelectric cooler.

The one or more actuators may comprise an acoustic actuator configured to generate acoustic sounds within the enclosure.

The apparatus may further comprise housed within the enclosure one or more of: an acoustic sensor, a thermal sensor, and a strain sensor.

In a further aspect of the disclosure, there is provided a method for verifying an event detection system. The method comprises: interrogating optical fiber positioned alongside a conduit by sending one or more light pulses along the optical fiber and receiving reflections of the one or more light pulses; and using an event verification device housed within an enclosure through which passes the optical fiber to generate one or more interference signals so as to alter an optical path length of the optical fiber and modify the received reflections.

The method may further comprise: obtaining phase data from the received reflections; and processing the phase data to extract parameter data therefrom. The method may further comprise determining whether an event detection system is functioning correctly using the extracted parameter data.

Determining whether the event detection system is functioning correctly may comprise identifying one or more parameters of the parameter data having a magnitude greater than a preset threshold.

The one or more interference signals may be representative of one or more events. Determining whether the event detection system is functioning correctly may comprise determining one or more events from the extracted parameter data, and comparing the determined one or more events to the one or more events represented by the one or more interference signals.

The parameter data may comprise data relating to one or more of temperature, acoustics, and strain. The method may further comprise transmitting the phase data from the interrogator.

Generating the one or more interference signals may comprise generating multiple different interference signals simultaneously.

The event verification device may comprise one or more actuators housed within the enclosure for generating the one or more interference signals.

The optical fiber may pass into and out of the enclosure via one or more apertures formed within the enclosure. The optical fiber may be spooled within the enclosure. In some embodiments, the optical fiber may be spooled around a resilient bias, such as a spring.

The method may further comprise determining a relationship between the extracted parameter data ("first parameter data") and the phase data, and using the relationship to adjust second parameter data obtained from the optical fiber. Thus, the event verification device may be used as a calibration tool.

The strain actuator may comprise a motor operable to drive rotation of a rotatable element such that the rotatable element periodically displaces the optical fiber, and the optical fiber may be wound about a resilient bias configured to bias the optical fiber against displacement from the rotatable element.

In a further aspect of the disclosure, there is provided an event detection system. The event detection system comprises: a conduit; optical fiber positioned alongside the conduit; an interrogator optically coupled to the optical fiber and configured to interrogate the optical fiber by sending one or more light pulses along the optical fiber and receiving reflections of the one or more light pulses; and an event verification device comprising an enclosure through which passes the optical fiber, wherein the event verification device is configured to generate one or more interference signals for interfering with the optical fiber within the enclosure such that an optical path length of the optical fiber is altered.

The system may further comprise a controller communicative with the event verification device and configured to instruct the event verification device to generate the one or more interference signals. The controller may be configured to instruct the device to generate one or more pre-programmed interference signals.

The interrogator may comprise, or consist of, the enclosure.

The event verification device may be buried beneath ground level.

The system may further comprise an optical circulator optically coupled to the optical fiber and comprising first, second, and third ports configured such that light entering the first port via a first portion of the optical fiber is sent out of the second port toward the event verification device via a second portion of the optical fiber, and light entering the second port from the event verification device via a third portion of the optical fiber is sent out of the third port via a fourth portion of the optical fiber.

The system may further comprise one or more processors communicative with memory having stored thereon computer program code configured when read by the one or more processors to cause the one or more processors to perform a method comprising: obtaining phase data from the received reflections; and processing the phase data to extract parameter data therefrom. The method may further comprise determining whether the event detection system is functioning correctly using the extracted parameter data. Determining whether the event detection system is functioning correctly may comprise identifying one or more parameters of the parameter data having a magnitude greater than a preset threshold. The parameter data may comprise data relating to one or more of temperature, acoustics, and strain. The controller may comprise the one or more processors and the memory.

The event verification device may comprise one or more actuators housed within the enclosure and configured to generate the one or more interference signals.

The method may further comprise determining a relationship between the extracted parameter data ("first parameter data") and the phase data, and using the relationship to adjust second parameter data obtained from the optical fiber.

BRIEF DESCRIPTION OF THE DRAWINGS

Embodiments of the disclosure will now be described in detail in conjunction with the accompanying drawings of which.

DETAILED DESCRIPTION OF EMBODIMENTS

The present disclosure seeks to provide improved methods and systems for detecting events in a conduit. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Figure 1A:
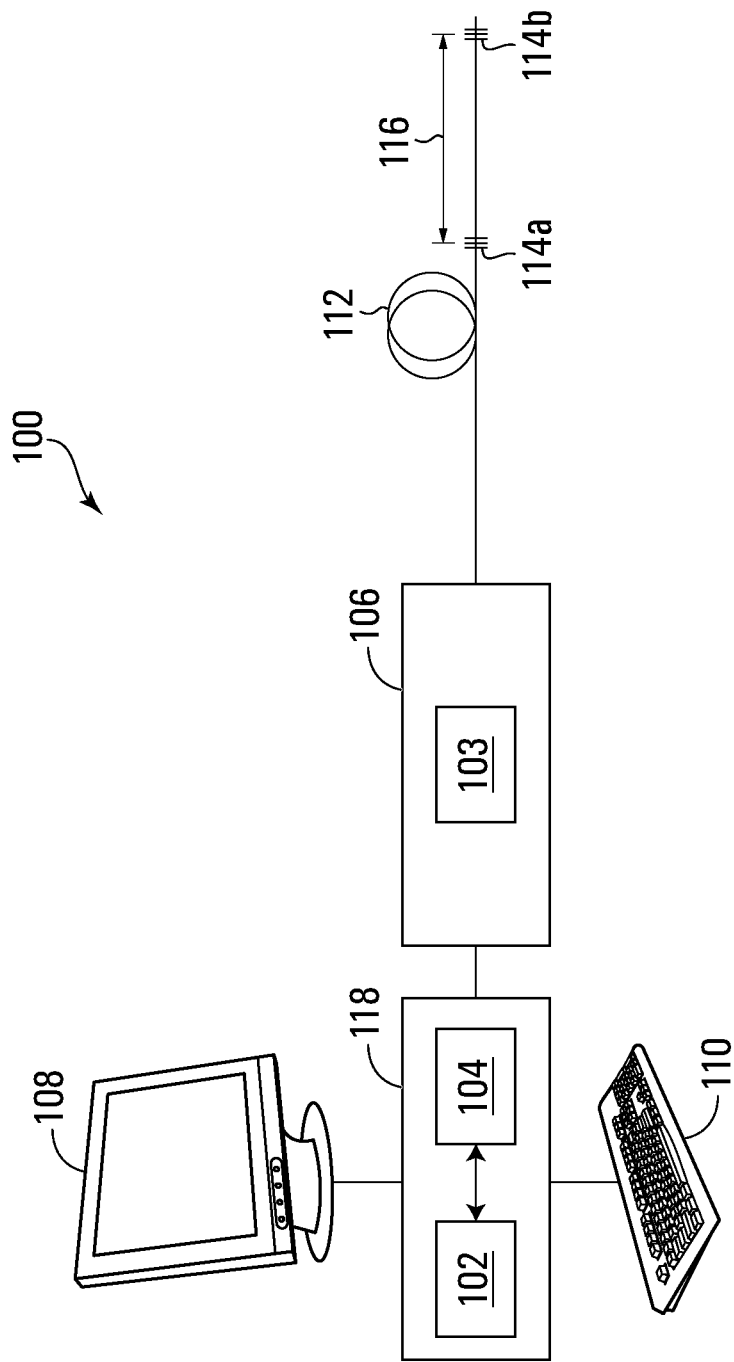
FIG. 1A is a block diagram of a system for determining whether an event has occurred from dynamic strain measurements, which includes an optical fiber with fiber Bragg gratings ("FBGs") for reflecting a light pulse, in accordance with embodiments of the disclosure.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous SiO2). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a, b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figure 1B:
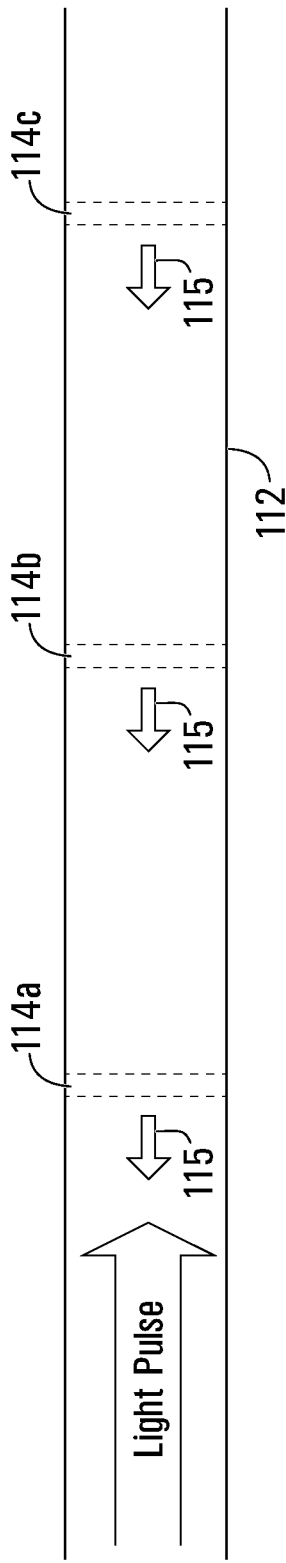
FIG. 1B is a schematic diagram that depicts how the FBGs reflect a light pulse.
Figure 1C:
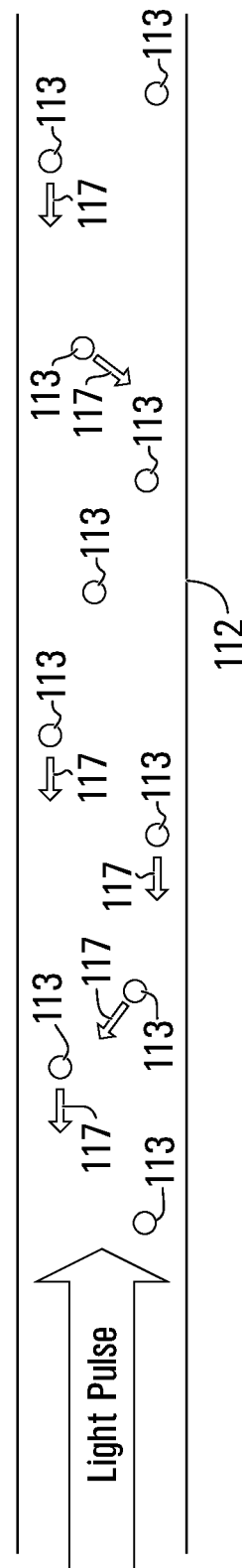
FIG. 1C is a schematic diagram that depicts how a light pulse interacts with impurities in an optical fiber that results in scattered laser light due to Rayleigh scattering, which is used for distributed acoustic sensing ("DAS")

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114*a* can reflect off the second FBG 114*b*, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (Θ) is as follows:

$$\Theta = 2\pi n L / \lambda,$$

where n is the index of refraction of the optical fiber, L is the physical path length of the fiber segment 116, and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

Figure 10:
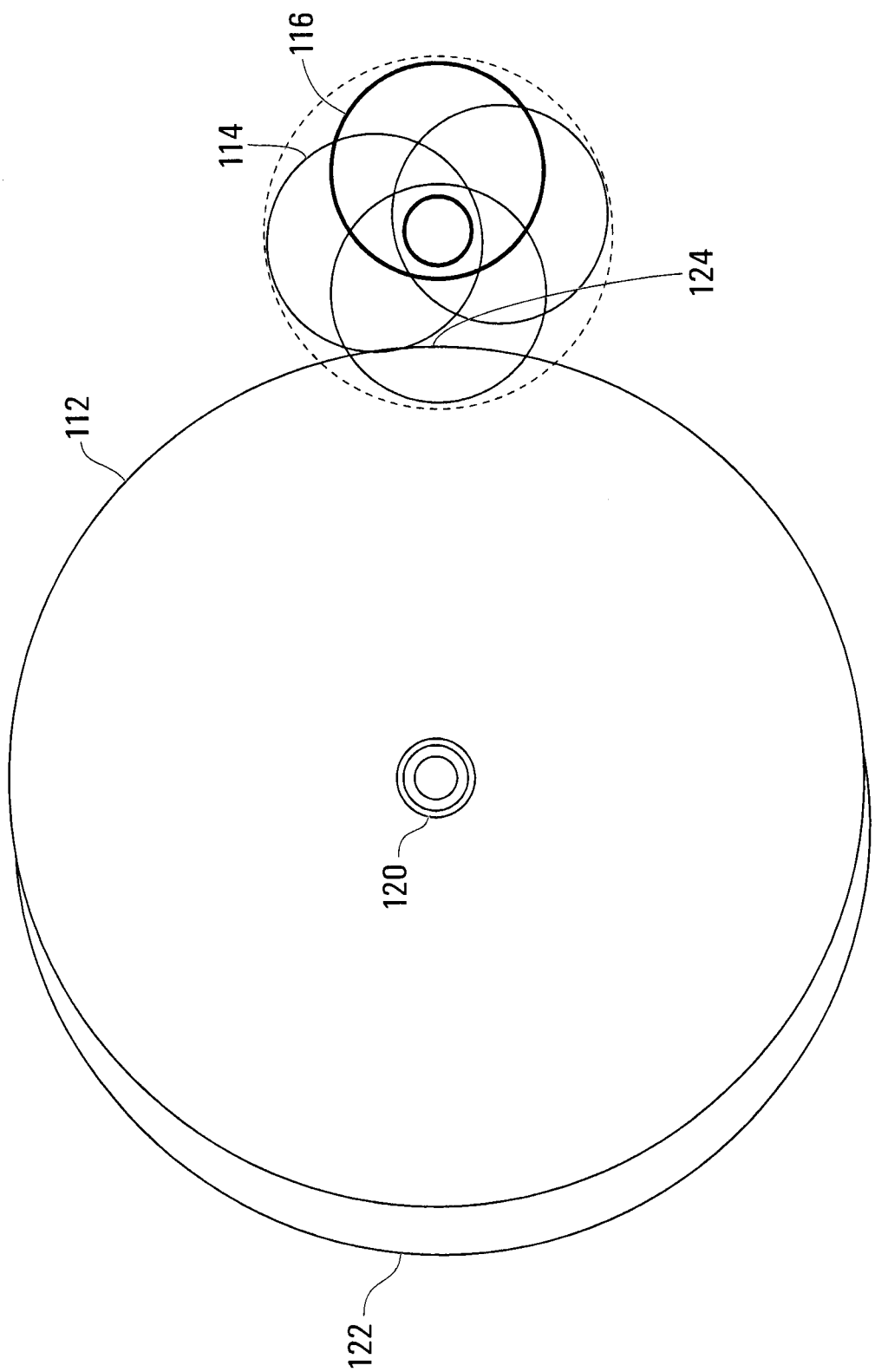
FIG. 10 is a schematic diagram of optical fiber spooled around a spring, according to embodiments of the disclosure.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 10, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 10, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
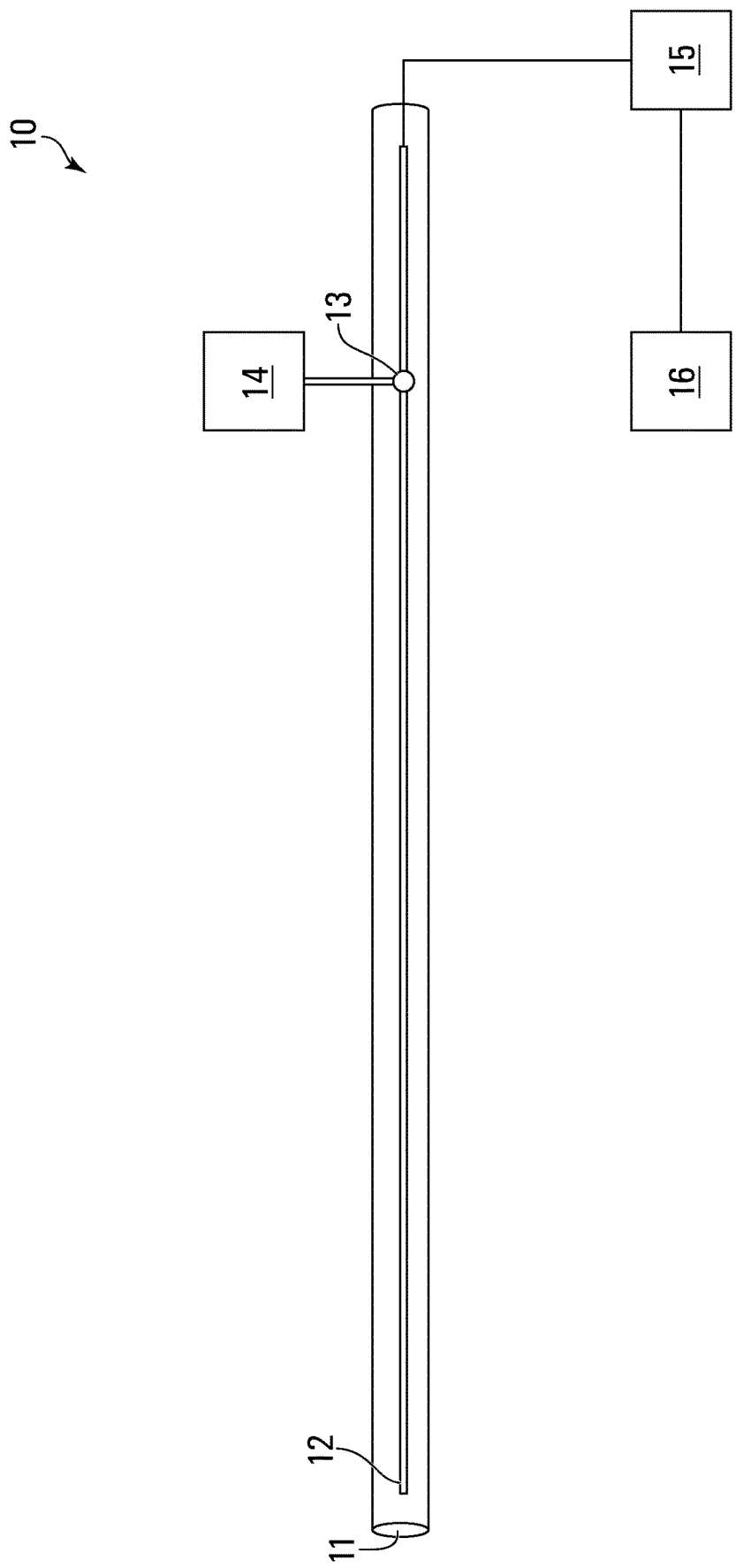
FIG. 2 is a schematic diagram of an optical interrogation system in accordance with embodiments of the disclosure.

Referring now to FIG. 2, there is shown an optical interrogation system 10 that may be used to detect events in a pipeline, in accordance with an embodiment of the disclosure. FIG. 2 shows a pipeline 11 alongside which is provided an optical fiber 12. In some embodiments, optical fiber 12 may comprise multiple individual interconnected lengths of optical fiber. In some embodiments, optical fiber 12 is attached directly to pipeline 11, whereas in other embodiments optical fiber 12 may be positioned within acoustic proximity of pipeline 11, meaning that optical fiber 12 is sufficiently close to pipeline 11 so as to detect acoustic energy originating from pipeline 11.

Optical fiber 12 is optically coupled to a verification device 14 and an interrogator 15. Interrogator 15 is configured to interrogate optical fiber 12 using optical fiber interferometry, as described above. Interrogator 15 is communicatively coupled to a control module 16. Control module 16 comprises one or more processors and one or more memories comprising computer program code executable by the one or more processors and configured, when executed by the one or more processors, to cause the one or more processors to process phase data obtained by interrogator 15 from interferences between light pulses transmitted along optical fiber 12. In some embodiments, control module 16 may be comprised within interrogator 15 such that interrogator 15 may perform the functions of control module 16.

Optical fiber 12 is divided into a number of channels or portions of optical fiber. In order to distinguish between different channels, interrogator 14 may employ techniques known in the art such as time division multiplexing (TDM) or wavelength division multiplexing (WDM), or a combination of both, as described above. For instance, in the context of WDM, different pulses having different wavelengths may be transmitted along optical fiber 12, and each channel of optical fiber 12 is provided with FBGs configured to reflect light having a certain wavelength. Depending on the wavelength of the reflections received from optical fiber 12, interrogator 15 may determine from which channel the reflections originated from.

Verification device 14 is provided in-line with optical fiber 12. Thus, an optical splitter 13 is employed to cause light transmitted down optical fiber 12 from interrogator 15 to be diverted toward verification device 14. After passing through verification device 14, the light exits verification device 14 and returns to optical splitter 13. Upon re-entering optical splitter 13, the light is redirected down optical fiber 12. Reflections of the light from FBGs provided along the length of optical fiber 12 pass through optical splitter 13 and return to interrogator 15 for processing. In further embodiments, optical interrogation system 10 may be provided with multiple verification devices 14. In addition, verification device may be located at other points along pipeline 11, for example at the end of optical fiber 12 opposite interrogator 15.

In some embodiments, verification device 14 may be optically coupled directly to interrogator 15, without the need to provide optical splitter 13. In such embodiments, a reduced-footprint verification device 14 may be integrated directly into interrogator 15. Verification device 14 may include a piezo-electric stretcher for stretching a compensator in interrogator 15—the piezo-electric stretcher would act as both a strain actuator and acoustic actuator (see below). A thermal actuator may also be used. Applying an acoustic/strain/thermal event to the compensator may cause the event to appear on all channels. A compensator may be a fiber optic coil used to delay the launch time of the interrogator's reference pulse. In some embodiments, the piezo-electric stretcher may be configured to stretch a different portion of optical fiber within interrogator 15, and does not necessarily have to stretch the compensator (for example, some interrogators do not require compensators).

Figure 3:
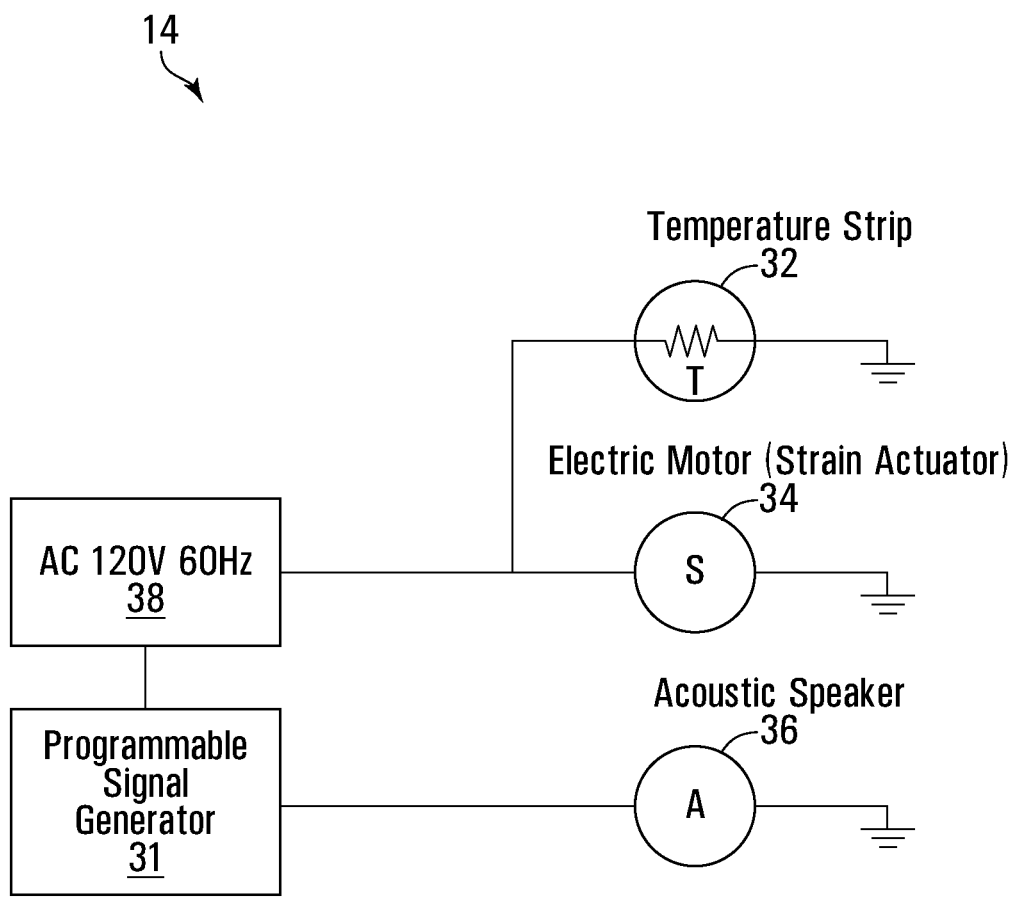
FIG. 3 is a schematic diagram of a verification device according to embodiments of the disclosure.

Turning to FIG. 3, there is shown a schematic view of verification device 14 according to an embodiment of the disclosure. Verification device 14 comprises, sealed within an enclosure, multiple actuators. In particular, verification device 14 includes a thermal actuator in the form of heat strip 32, a strain actuator in the form of electric motor 34, and an acoustic actuator in the form of acoustic speaker 36. AC power source 38 is configured to provide power for driving each of actuators 32, 34, 36. In addition, verification device 14 includes a programmable signal generator 31 for modulating the power delivered from power source 38 to acoustic speaker 36. In addition to driving speaker 36 with any desired audio signal, speaker 36 may play back the audio signal from events of interest, such as leaks. The audio file may be pre-programmed into speaker 36 and simply activated upon receipt of AC power.

Figure 4:
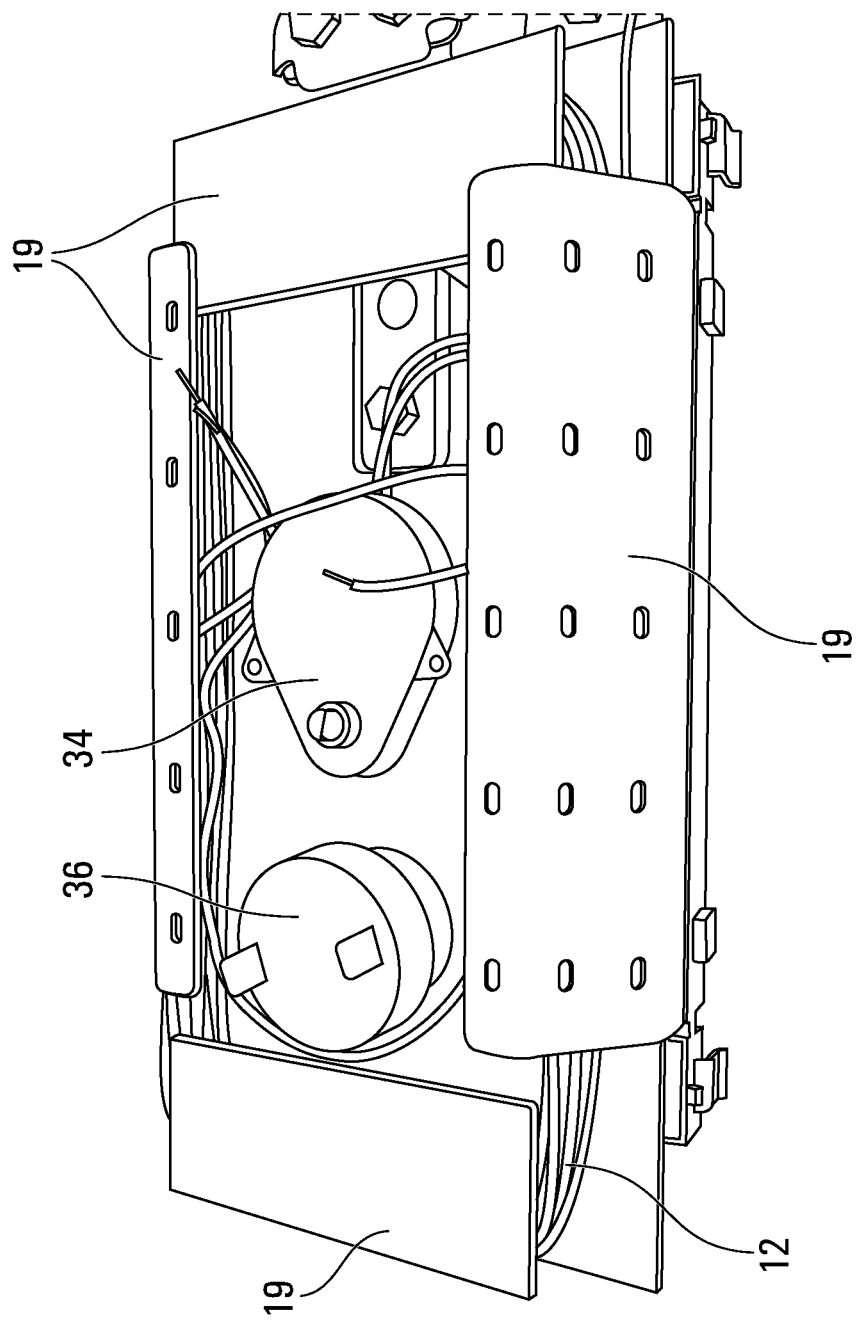
FIG. 4 is a perspective view of a verification device according to embodiments of the disclosure.

FIG. 4 is a perspective view of verification device 14, according to an embodiment of the disclosure. Optical fiber 12 is coiled about supports 19, with electric motor 34 and acoustic speaker 36 located centrally with respect to the windings of optical fiber 12. Coiling optical fiber 12 in this manner may increase the sensitivity of optical fiber 12 to stimuli delivered by actuators 32, 34, 36.

Figure 5:
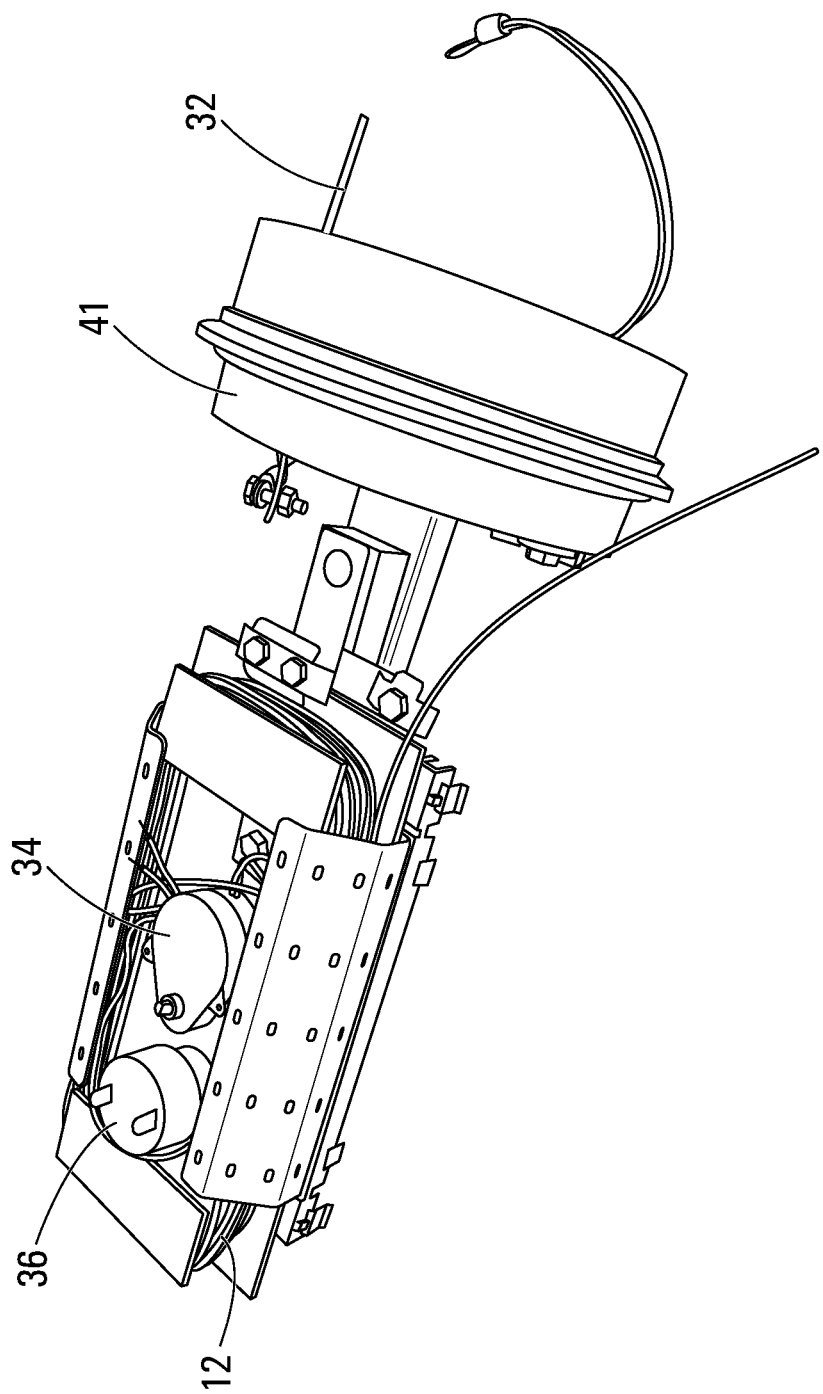
FIG. 5 is a perspective view of the verification device of FIG. 4 with an enclosure lid, according to embodiments of the disclosure.
Figure 6:
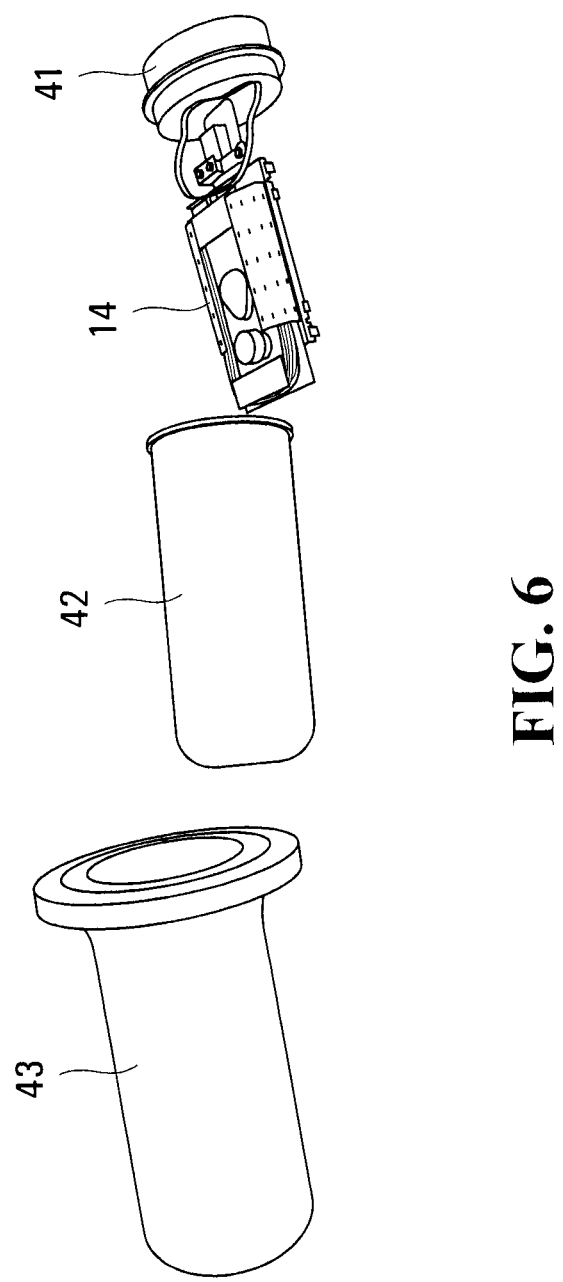
FIG. 6 is a perspective view of the verification device of FIG. 4 prior to sealing within an enclosure, according to embodiments of the disclosure.

FIG. 5 shows another view of verification device 14, with heat strip 32 attached to an enclosure lid 41. Turning to FIG. 6, verification device 14 is housed within an enclosure 42 by inserting verification device 14 within enclosure 42 and sealing enclosure 42 with enclosure lid 41. Enclosure 42 may then be stored within a water and shock-proof housing 43 for added protection during installation. Although not shown in FIGS. 4-6, optical fiber 12 enters and exits enclosure 42 via through-holes formed within enclosure lid 41. After verification device 14 is sealed within water and shock-proof housing 43, verification device 14 is then be coupled to optical interrogation system 10. For example, verification device 14 is coupled to optical splitter 13 as per FIG. 2.

Actuators 32, 34, 36 are configured to generate thermal, strain, and acoustic interference signals. Such signals alter the optical path length of optical fiber 12, and interrogator 15 detects and reports such signals as events, as described in further detail below. For example, verification device 14 may be used to simulate a leak in pipeline 11 (by actuating one or more of actuators 32, 34, 36), and if optical interrogation system 10 is functioning correctly then interrogator 15 will detected the simulated leak and report it to an operator of system 10.

Figure 7:
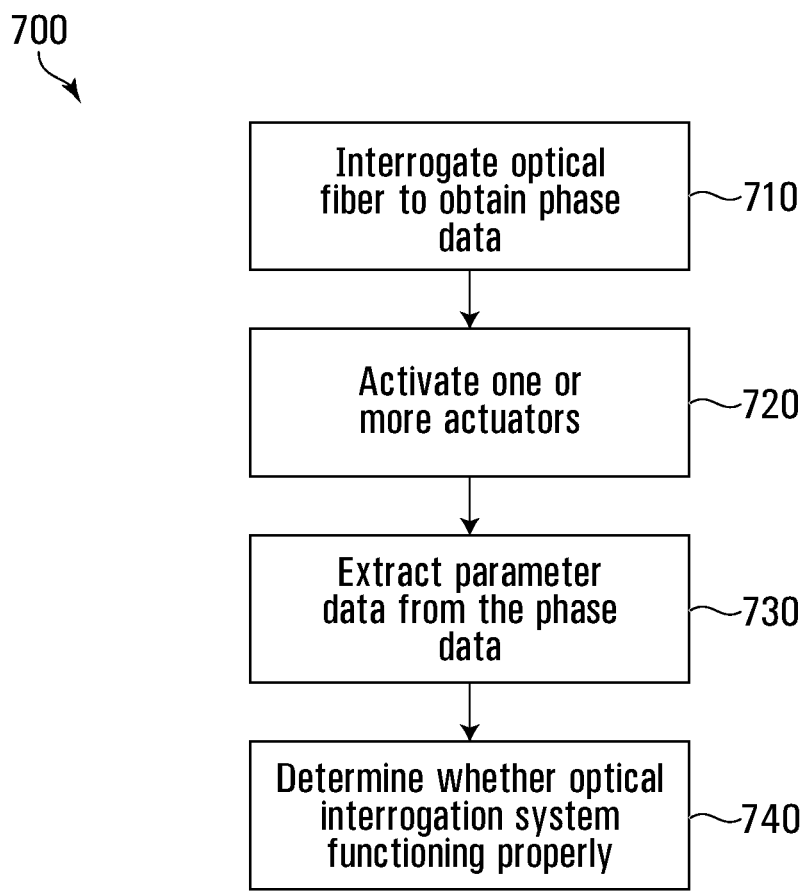
FIG. 7 is a flow diagram of a method for verifying an event detection system, in accordance with embodiments of the disclosure.

Turning to FIG. 7, there is shown a method 700 for verifying an event detection system, in accordance with an embodiment of the disclosure. At block 710, interrogator 15 interrogates optical fiber 12 positioned alongside pipeline 11 by sending one or more light pulses along optical fiber 12 and receiving reflections of the one or more light pulses. Simultaneously, as described in further detail below, at block 720 one or more of actuators 32, 34, 36 are used to generate one or more interference signals for altering the optical path length of optical fiber 12, thereby modifying the received reflections. Interrogator 15 obtains phase data from the received reflections, as described above, and at block 730 controller 16 processes the phase data to extract parameter data therefrom. Suitable methods of parameter extraction are described in more detail in international patent publication WO 2017/147679, the contents of which is hereby incorporated by reference in its entirety.

At block 740, it is determined whether optical interrogation system 10 is functioning correctly. For example, controller 16 may determine whether the interference generated by actuators 32, 34, 36 is identifiable in the extracted parameter data. In some embodiments, controller 16 may apply one or more of the event detection algorithms described in WO 2017/147679 to detect one or more events in the extracted parameter data, and may then determine whether the interference generated by actuators 32, 34, 36 corresponds to one or more of the detected events. For example, the detected one or more events may be compared to the one or more interference signals generated by the actuators.

Figure 8:
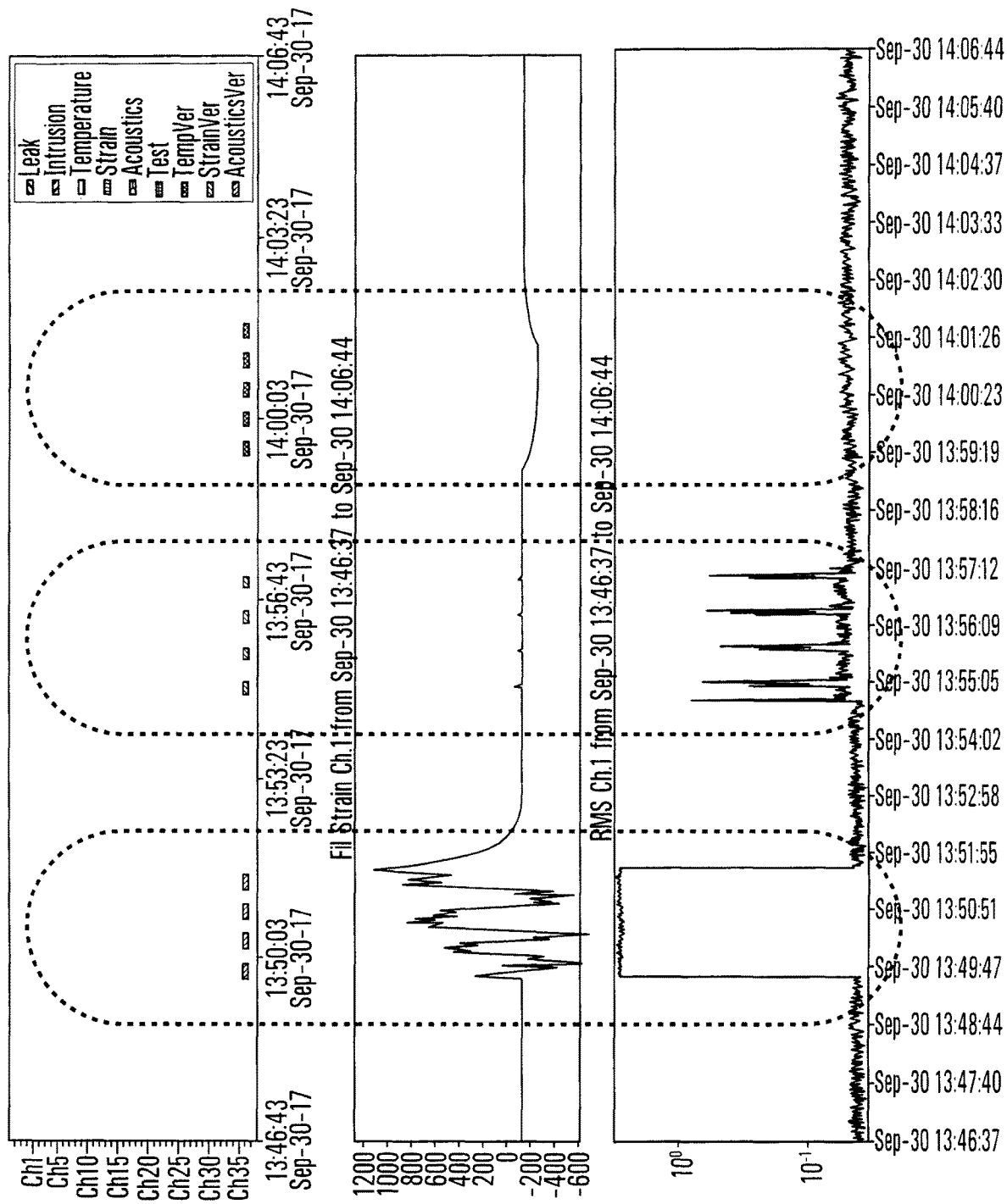
FIG. 8 shows plots of experimental data obtained using a verification device according to embodiments of the disclosure.

FIG. 8 shows three subplots of experimental data obtained using a verification device according to embodiments of the disclosure. The bottom subplot shows the magnitude of the acoustic activity extracted from the phase data. This plot shows the acoustic activity generated by the actuators in the verification device. The middle subplot shows the strain and temperature effects induced on the optical fiber by the verification device. Strain and temperature generally appear in the same frequency range and can be separated using algorithms described in PCT patent publication WO 2016/183677 (the contents of which is hereby incorporated by reference in its entirety). The top subplot shows events identified by event detection algorithms (for example the event detection algorithms described in WO 2017/147679).

Three different events are simulated in this case. The left-most event is a combination of an acoustic event and a strain event. The event detection algorithm identifies the acoustic signature and flag the event as an acoustic event, as shown in the top subplot. This particular event detection algorithm has been set to flag as an acoustic event an event with an acoustic signature that lasts longer than 15 seconds, even if other signatures are present. The definition of an event is user-configurable. The middle event is a strain event induced by the movement of the pistons (i.e. strain actuators) generating multiple strain signatures on the optical fiber. In this case, the event detection algorithm has been set such that these events are recognized as strain events. The right-most event is a thermal event, with the event flagged as such by the event detection algorithm, as shown in the top subplot.

As mentioned above, actuators 32, 34, 36 are configured, when driven by power source 38, to generate interference signals for interfering with the path length of optical fiber 12. In particular, heat strip 32 is configured to increase a temperature within enclosure 42, which temperature increase causes the optical path length of optical fiber 12 to be altered. Similarly, electric motor 34 is configured to drive a rotating disc for displacing optical fiber 12, and acoustic speaker 36 generates acoustic sounds within enclosure 42. Although in the above-described embodiment actuators 32, 34, 36 take the form of a heat strip, an electric motor, and an acoustic speaker, actuators 32, 34, 36 may take various other forms.

For example, in one embodiment, a piezo buzzer such as a McMaster-Carr 56965T26 can be used. Such a buzzer is configured to emit a tone or other pre-programmed sound pattern at a fixed magnitude upon reception of AC power. In other embodiments, various pre-programmed sound files may be delivered to acoustic actuator 36, via signal generator 31. Thus, the response of optical interrogation system 10 to sounds of different patterns and loudness levels may be tested. For example, the response of optical interrogation system 10 to a low-magnitude sound file which may contain the acoustic signature of a hydrocarbon leak from a pipeline may be tested. Various types of thermal actuators can be used. For example, a McMaster-Carr 3576K71 strip heater, heat tape, or a current-controlled thermal microchip can be used. Luminescent thermal sources such as light bulbs may also be used. Generally, a thermal change of 0.1-5° C. is sufficient for simulating realistic thermal events.

Various types of strain actuators may be used. For example, a piston may be used to displace optical fiber 12, in which case verification device 14 may include an air compressor and air hose configured to deliver air to the piston. In other embodiments, an inflatable bladder may be used (in which case a pressure regulator should also be used to control the flow of air to the bladder). In some embodiments, a synchronous gearmotor (such as the McMaster-Carr 3867K3) may be used to generate a low-rate (e.g. <5 rpm) rotary action near optical fiber 12 for displacing optical fiber 12. Generally, a displacement of 1 mm-5 cm is sufficient for simulating realistic strain events. In some embodiments, a spring or other resilient bias can be used to pre-load optical fiber 12 (or a conduit in which optical fiber 12 is located) to increase the effect of the displacement induced by the rotation of the gearmotor, piston, or other strain actuator.

Verification device 14 may be programmed (for example using programmable signal generator 31) to deliver interference signals from multiple ones of actuators 32, 34, 36. For example, some pipeline events such as leaks contain a combination of acoustic, strain, and thermal signatures. Verification device 14 may therefore be used to deliver a combination of different interference signals using multiple ones of actuators 32, 34, 36, to replicate such signatures.

Verification device 14 may be configured to operate in a manual mode, in which case separate power lines are used to deliver AC power to actuators 32, 34, 36 from AC power source 38. In an alternative embodiment, a remotely-controlled power distribution unit, such as Racklink model SW815R-SP from Middle Atlantic, may be used to separately control the AC power connection to each of actuators 32, 34, 36. The operator can control the duration of an induced event by changing the length of time each output port of the power distribution unit is enabled. In more advanced modes, the start time and the duration of each event may be pre-programmed. Thus, one or more of actuators 32, 34, 36 may be remotely and automatically activated, depending on the pre-programming provided to the power distribution unit.

An electrical fuse can be used to protect verification device 14 in case of excessive electrical current draw, which could be indicative of an electrical short circuit in the device. In addition, a temperature fuse can be added in order to avoid overheating of verification device 14.

In some embodiments, verification device 14 may include one or more of a temperature sensor to measure the generated temperature effects, and a displacement sensor to measure the displacement caused by the strain actuator. The recorded physical signature of the events may be either transmitted to a host processing device (such as controller 16) or analyzed by a microcontroller or other processor located inside enclosure 42 with verification device 14.

Verification device 14 may be buried in a handhole (splice enclosure) near pipeline 11, or may be placed in an aboveground enclosure.

In the above-described embodiments, actuators 32, 34, 36 are said to induce interference signals on optical fiber 12. In some embodiments, optical fiber 12 may be located within a conduit (e.g. for protection), in which case actuators 32, 34, 36 may induce interference signals directly on the conduit, such interference signals subsequently being detected by optical fiber 12.

Verification device 14 may additionally be used as a calibration tool. For example, knowing that a certain applied level of strain (2 mm of displacement) causes a certain number of radians of deflection in the output (phase measurement) received at interrogator 15, the measurement of verification device 14 may be used to calibrate the performance of optical fiber 12 at other locations along pipeline 11 (i.e. at other channels of optical fiber 12). Similarly, verification device 14 may be used to establish a calibration formula between degrees of change in temperature and measured change in the measured phase, and also between dB of acoustic stimulus and radians in the measured phase. Care should be taken, when extracting calibration formulae, to compensate for the increased sensitivity of optical fiber 12 to verification device 14. Using verification device 14 as a calibration tool can be beneficial for tracking changes to the sensitivity of optical fiber 12 as optical fiber 12 undergoes a range of environmental conditions over time. For example, changes in ambient temperature may affect the response of optical fiber 12 to induced events, or fiber sensitivity may be reduced due to effects such as a drop in the incident light power or hydrogen darkening over time.

Figure 9:
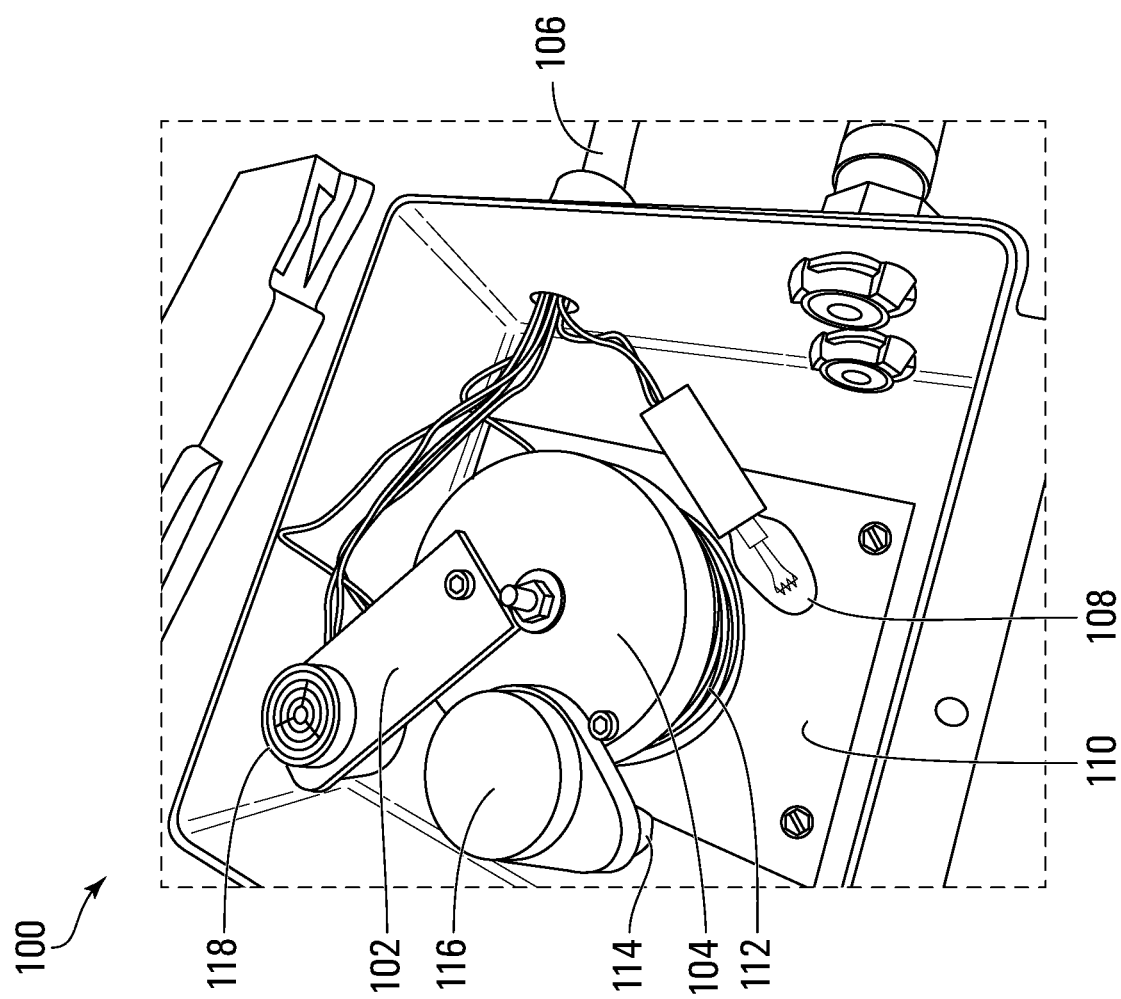
FIG. 9 shows a verification device according to embodiments of the disclosure.

FIG. 9 shows another verification device 100 according to an embodiment of the disclosure. Generally, verification device 100 comprises a mounting bracket 102 attached to a stationary top plate 104, a electric cable conduit 106, a heat source (such as an incandescent bulb) 108, a base plate 110, spooled optical fiber 112 provided between base plate 110 and top plate 104, a rotating disc 114, an AC motor 116, and an acoustic transducer 118.

FIG. 10 shows the interaction of rotating disc 114 and optical fiber 112 in more detail. In particular, optical fiber 112 is spooled around a resilient bias such as a spring 120. AC motor 116 drives rotation of rotating disc 114 such that rotating disc 114 periodically urges optical fiber 112 into a strained position. Optical fiber 112 is shown in a fully strained position 122 when rotating disc 114 is maximally engaged with optical fiber 112, and in an unstrained position 124 when rotating disc 114 is not engaged with optical fiber 112. Providing spooled optical fiber 112 around spring 120 enables optical fiber 112 to "float" such that optical fiber 112 may move from an unstrained position to a strained position more readily, thereby reducing the pressure on optical fiber 112. Thus, the engagement of rotating disc 114 with optical fiber 112 is less likely to damage optical fiber 112.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. An apparatus for use with an event detection system, comprising:
    an enclosure comprising one or more apertures for receiving optical fiber therethrough; and one or more actuators housed within the enclosure and configured to generate one or more interference signals for interfering with optical fiber within the enclosure such that an optical path length of the optical fiber is altered, wherein the one or more actuators comprise a strain actuator configured to move between first and second positions for displacing optical fiber within the enclosure, and wherein the apparatus further comprises a resilient bias configured to bias optical fiber within the enclosure against displacement from the strain actuator.

2. The apparatus of claim 1, further comprising optical fiber passing into and out of the enclosure via the one or more apertures.

3. The apparatus of claim 1, wherein the strain actuator comprises one or more of a piston, an inflatable member, and a gear motor.

4. The apparatus of claim 1, wherein the one or more actuators comprise a thermal device configured to generate or remove heat for adjusting a temperature within the enclosure.

5. The apparatus of claim 4, wherein the thermal device comprises one or more of a microchip, a strip heater, heat tape, an incandescent light source, and a thermoelectric cooler.

6. The apparatus of claim 1, wherein the one or more actuators comprise an acoustic actuator configured to generate acoustic sounds within the enclosure.

7. The apparatus of claim 1, further comprising housed within the enclosure one or more of: an acoustic sensor, a thermal sensor, and a strain sensor.

8. A method for verifying an event detection system, comprising:

interrogating optical fiber positioned alongside a conduit by sending one or more light pulses along the optical fiber and receiving reflections of the one or more light pulses; and using an event verification device housed within an enclosure through which passes the optical fiber to generate one or more interference signals so as to alter an optical path length of the optical fiber and modify the received reflections, wherein the strain actuator comprises a motor operable to drive rotation of a rotatable element such that the rotatable element periodically displaces the optical fiber, and wherein the optical fiber is wound about a resilient bias configured to bias the optical fiber against displacement from the rotatable element.

9. The method of claim 8, further comprising:
obtaining phase data from the received reflections; and
processing the phase data to extract parameter data therefrom.

10. The method of claim 9, further comprising determining whether an event detection system is functioning correctly using the extracted parameter data.

11. The method of claim 10, wherein determining whether the event detection system is functioning correctly comprises identifying one or more parameters of the parameter data having a magnitude greater than a preset threshold.

12. The method of claim 10, wherein the one or more interference signals are representative of one or more events, and wherein determining whether the event detection system is functioning correctly comprises determining one or more events from the extracted parameter data, and comparing the determined one or more events to the one or more events represented by the one or more interference signals.

13. The method of claim 9, wherein the parameter data comprises data relating to one or more of temperature, acoustics, and strain.

14. The method of claim 9, further comprising transmitting the phase data from the interrogator.

15. The method of claim 8, wherein generating the one or more interference signals comprises generating multiple different interference signals simultaneously.

16. The method of claim 9, further comprising determining a relationship between the extracted parameter data and the phase data, and using the relationship to adjust further parameter data obtained from the optical fiber.

17. An event detection system comprising:
a conduit;
optical fiber positioned alongside the conduit;
an interrogator optically coupled to the optical fiber and configured to interrogate the optical fiber by sending one or more light pulses along the optical fiber and receiving reflections of the one or more light pulses;
an event verification device comprising an enclosure through which passes the optical fiber, wherein the event verification device is configured to generate one or more interference signals for interfering with the optical fiber within the enclosure such that an optical path length of the optical fiber is altered; and
an optical circulator optically coupled to the optical fiber and comprising first, second, and third ports configured such that light entering the first port via a first portion of the optical fiber is sent out of the second port toward the event verification device via a second portion of the optical fiber, and light entering the second port from the event verification device via a third portion of the optical fiber is sent out of the third port via a fourth portion of the optical fiber.

18. The system of claim 17, further comprising a controller communicative with the event verification device and configured to instruct the event verification device to generate the one or more interference signals.

19. The system of claim 17, wherein the controller is configured to instruct the event verification device to generate one or more pre-programmed interference signals.

20. The system of claim 17, wherein the interrogator comprises the enclosure.

21. The system of claim 17, wherein the event verification device is buried beneath ground level.

22. An apparatus for use with an event detection system, comprising:
an enclosure comprising one or more apertures for receiving optical fiber therethrough; and
one or more actuators housed within the enclosure and configured to generate one or more interference signals for interfering with optical fiber within the enclosure such that an optical path length of the optical fiber is altered,
wherein the one or more actuators comprise a strain actuator configured to move between first and second positions for displacing optical fiber within the enclosure, and
wherein the strain actuator comprises one or more of a piston, an inflatable member, and a gear motor.

* * * * *